United States Patent
Guidry

(10) Patent No.: US 6,938,368 B2
(45) Date of Patent: Sep. 6, 2005

(54) WEIGHT ADJUSTABLE RODENT TRAP

(76) Inventor: Gary D. Guidry, 1324 Ptch St., Apt. 3, Sulphur, LA (US) 70665

( * ) Notice: Subject to any disclaimer, the term of this patent is extended or adjusted under 35 U.S.C. 154(b) by 0 days.

(21) Appl. No.: 10/689,943

(22) Filed: Oct. 21, 2003

(65) Prior Publication Data

US 2005/0081425 A1 Apr. 21, 2005

(51) Int. Cl.⁷ .............................................. A01M 23/04
(52) U.S. Cl. ........................ 43/69; 43/70; 43/71; 43/72
(58) Field of Search ............................... 43/64, 65, 69, 43/70, 71, 72, 74

(56) References Cited

U.S. PATENT DOCUMENTS

| | | | |
|---|---|---|---|
| 1,102,896 A | | 7/1914 | Fischer |
| 1,353,882 A | * | 9/1920 | Wojcik ........................ 43/69 |
| 3,791,065 A | * | 2/1974 | Snow ........................... 43/69 |
| 3,936,972 A | * | 2/1976 | Meyers et al. ............... 43/69 |
| 4,048,745 A | | 9/1977 | Morford |
| 4,062,142 A | * | 12/1977 | Marotti ........................ 43/61 |
| 4,145,834 A | * | 3/1979 | Quigley ....................... 43/73 |
| 4,151,673 A | | 5/1979 | Campbell |
| 4,154,016 A | | 5/1979 | Reyes |
| 4,241,531 A | | 12/1980 | Nelson |
| 4,379,374 A | * | 4/1983 | Lindley ........................ 43/61 |
| 4,393,616 A | * | 7/1983 | Kaufman et al. ............. 43/60 |
| 4,429,483 A | * | 2/1984 | Murakami .................... 43/70 |
| 4,706,407 A | | 11/1987 | Melton |
| 4,748,766 A | * | 6/1988 | Stimac ......................... 43/69 |
| 4,876,821 A | * | 10/1989 | Benzie ......................... 43/69 |
| 4,937,968 A | | 7/1990 | Thomas |
| 4,984,382 A | * | 1/1991 | Yost ............................. 43/61 |
| 5,347,747 A | | 9/1994 | Henriques |
| 5,410,837 A | * | 5/1995 | Kazzyk ........................ 43/66 |
| 5,471,781 A | | 12/1995 | Vine |
| 6,016,623 A | * | 1/2000 | Celestine ..................... 43/61 |
| 6,088,948 A | * | 7/2000 | R.o slashed.nnau ......... 43/72 |
| 6,212,819 B1 | | 4/2001 | Edwards |
| 6,691,452 B1 | * | 2/2004 | Knuppel et al. .............. 43/69 |

FOREIGN PATENT DOCUMENTS

| | | | |
|---|---|---|---|
| FR | 2563083 | * | 10/1985 |
| WO | WO 02/11535 | * | 2/2002 |

* cited by examiner

Primary Examiner—Peter M. Poon
Assistant Examiner—David J Parsley
(74) Attorney, Agent, or Firm—Dale J. Ream

(57) ABSTRACT

A rodent trap includes a housing having bottom and top walls and defining an interior space. A ramp extends between top and bottom walls and defines an entry opening through which a rodent may enter the housing. A bait container mounted inside the housing lures a rodent to enter. A platform extends from the entry opening into the interior space and includes a selectively positionable metallic element. A trip board is pivotally mounted within the housing and is movable between set and tripped configurations. A magnet is selectively positioned on the trip board so as to bias the trip board toward the set configuration until a rodent's weight on another portion thereof causes it to rotate to the second configuration. A container is positioned in the housing for receiving a rodent that is deposited at the second configuration. A plurality of probes prevent a rodent from reversing course.

16 Claims, 6 Drawing Sheets

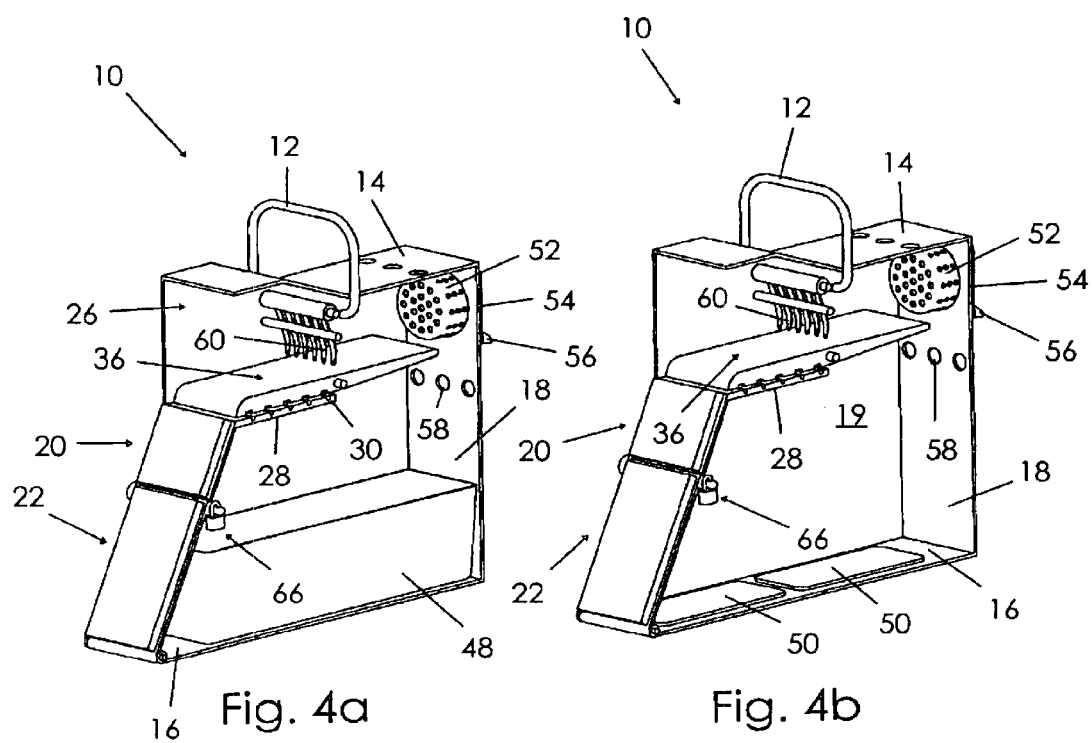

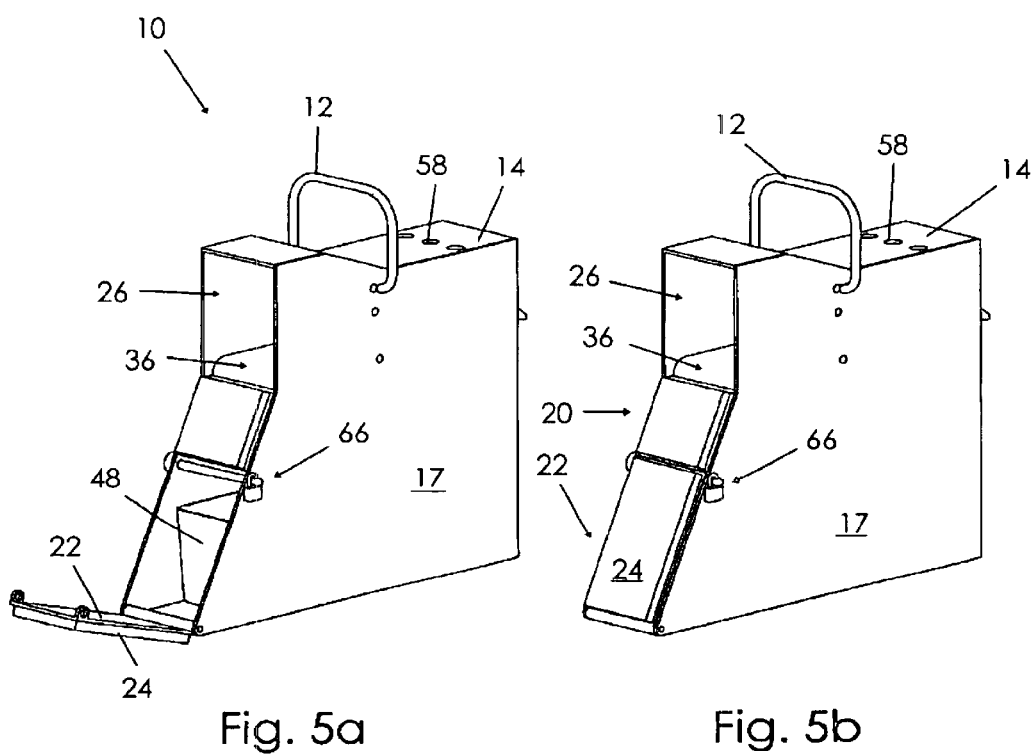

WEIGHT ADJUSTABLE RODENT TRAP

BACKGROUND OF THE INVENTION

This invention relates generally to rodent traps and, more particularly, to a rodent trap having a tripping assembly that is adjustable for optimizing success in trapping rodents of various weights.

A difficulty in repeatedly catching mice or other rodents is that the rodents eventually learn how to avoid the trap or are deterred at the sight of another rodent that has already been trapped. Various types of traps have been proposed throughout the years for catching mice and other rodents. Although assumably effective for their intended purposes, the existing devices for trapping rodents do not successfully inhibit rodents from learning to avoid the trap or they inhibit other rodents from being trapped once one rodent has been caught. Further, existing devices are not adjustable for trapping rodents of various weights.

Therefore, it is desirable to have a rodent trap that is adjustable for trapping rodents of various weights. In other words, it is desirable that the stability of a trip board can be adjusted according to the weights of the rodents intended to be trapped such that the trip board is not released until the rodent believes it is safe to proceed. Further, it is desirable to have a rodent trap which traps rodents in a containment area separated from an entry and bait area such that entering rodents are not deterred at the sight of already trapped rodents.

SUMMARY OF THE INVENTION

A weight adjustable rodent trap according to the present invention includes a housing having a generally box-shaped configuration having a ramp that extends substantially between the top and bottom walls. The housing defines an interior space and the ramp is situated to define an entry opening adjacent the top wall such that a rodent may enter the interior space after ascending the ramp. A platform is mounted within the housing and extends from the entry opening inwardly into the interior space. A trip board is pivotally mounted within the housing and is rotatable between a set configuration in which a portion thereof rests upon the platform and a tripped configuration that is rotated relative to the platform. In the tripped configuration, the trip board serves as a trap door so as to deposit a rodent into a containment area beneath the trip board.

The platform and one portion of the trip board include a complementary metallic element and magnet, respectively. At the set configuration, the metallic element and magnet are drawn toward one another which allows the trip board to maintain its position even when a rodent proceeds to an opposed, free standing portion of the trip board—that is, until the weight of the rodent overcomes the magnetic attraction. At that point, the trip board will rotate to deposit the rodent into the containment area. The center of gravity of the trip board is positioned relative to its pivot point such that the trip board returns to the set configuration after the rodent is deposited.

Therefore, a general object of this invention is to provide a rodent trap which for repeatedly trapping rodents without having to be reset after each catch.

Another object of this invention is to provide a rodent trap, as aforesaid, which coaxes a rodent to proceed along a trip board beyond a "point of no return" before depositing the rodent into a containment area.

Still another object of this invention is to provide a rodent trap, as aforesaid, having a trip board that is magnetically held in place until a rodent is at a predetermined trip location on the trip board.

Yet another object of this invention is to provide a rodent trap, as aforesaid, in which the positions of a magnet and metallic element for holding the trip board in a set configuration are adjustable such that the weight needed to trip the trip board is selectable.

A further object of this invention is to provide a rodent trap, as aforesaid, in which a rodent containment area is separated from a rodent entry and trapping area.

A still further object of this invention is to provide a rodent trap, as aforesaid, having a removable bait container.

Another object of this invention is to provide a rodent trap, as aforesaid, which includes a plurality of pivotal prongs that prevent a rodent from reversing course after first proceeding along the trip board.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 4a is another perspective view of the rodent trap as in FIG. 2 utilizing a container as the containment means;

FIG. 4b is a perspective view of the rodent trap as in FIG. 4a utilizing glue strips as the containment means;

FIG. 5a is another perspective view of the rodent trap with a ramp portion in an open configuration; and FIG. 5b is a perspective view of the rodent trap with the ramp portion in a closed configuration.

DESCRIPTION OF THE PREFERRED EMBODIMENT

Figure 1:
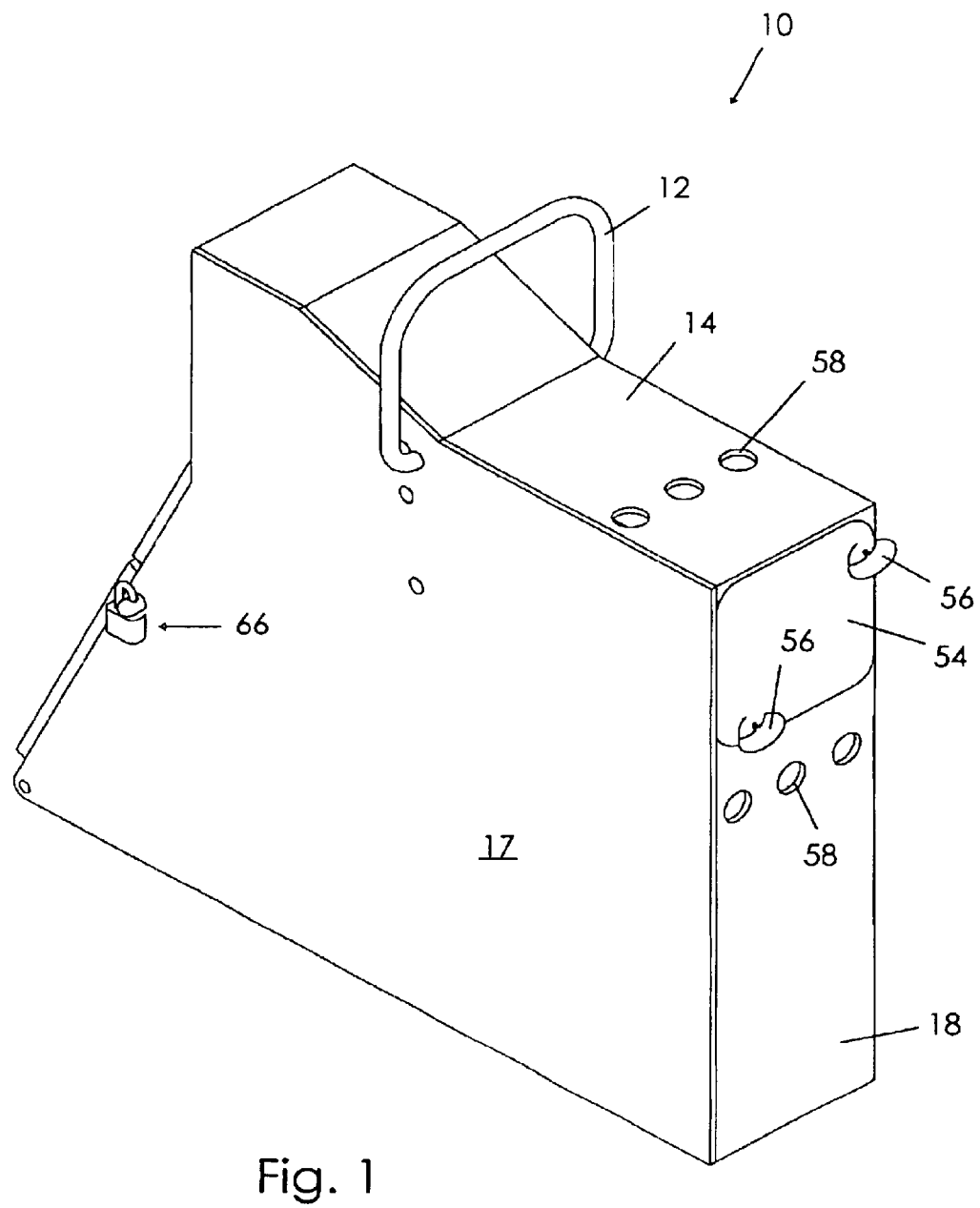
FIG. 1 is a perspective view of a rodent trap according to a preferred embodiment of the present invention.

A weight adjustable rodent trap 10 according to a preferred embodiment of the present invention will now be described in detail with reference to FIGS. 1 through 5b of the accompanying drawings. The rodent trap 10 includes a housing having a generally upstanding box-shaped configuration (FIG. 1) although other configurations utilizing the yet to be described features would also be suitable. More particularly, the housing includes top 14 and bottom 16 walls with front 17 and back 19 walls extending therebetween so as to substantially enclose the housing and define an interior space. The front wall 17 is preferably constructed of a transparent material to enable a user to view the interior space. A handle 12 may be mounted atop the top wall 14 for carrying the rodent trap 10 (FIG. 1).

Figure 2:
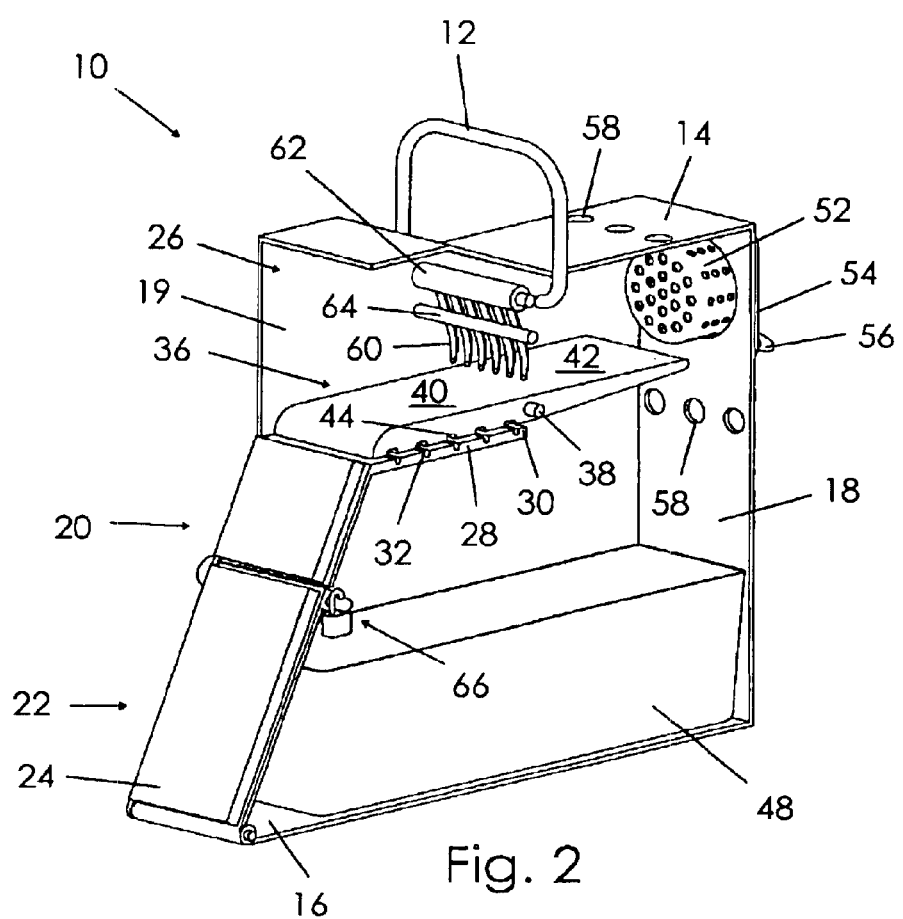
FIG. 2 is a perspective view from another angle of the rodent trap as in FIG. 1 with a front wall removed.

Further, a ramp 20 acts as one side wall and extends substantially between the top 14 and bottom 16 walls at an oblique angle such that rodents may ascend the ramp 20 (FIG. 2). The ramp 20 is situated, however, so as to define an entry opening 26 adjacent the top wall 14 of the housing so as to enable a rodent to enter into the interior space of the housing after having ascended the ramp 20. The ramp 20 may be covered with a layer of carpet 24 or imprinted with a heavy texture to enhance a rodent's ability to ascend the ramp 20 (FIG. 2). The ramp 20 essentially serves as a first side wall. Another side wall 18 extends between the top 14 and bottom 16 walls and is positioned at an opposing side of the housing (FIG. 1) and will be described in more detail later.

A platform 28 is mounted within the interior space of the housing and extends inwardly from the entry opening 26. Preferably, the platform 28 is connected to an upper edge of the ramp 20 and extends in a generally level horizontal plane less than half the width of the housing between the ramp 20 and second side wall 18 (FIG. 2).

Figure 3A:
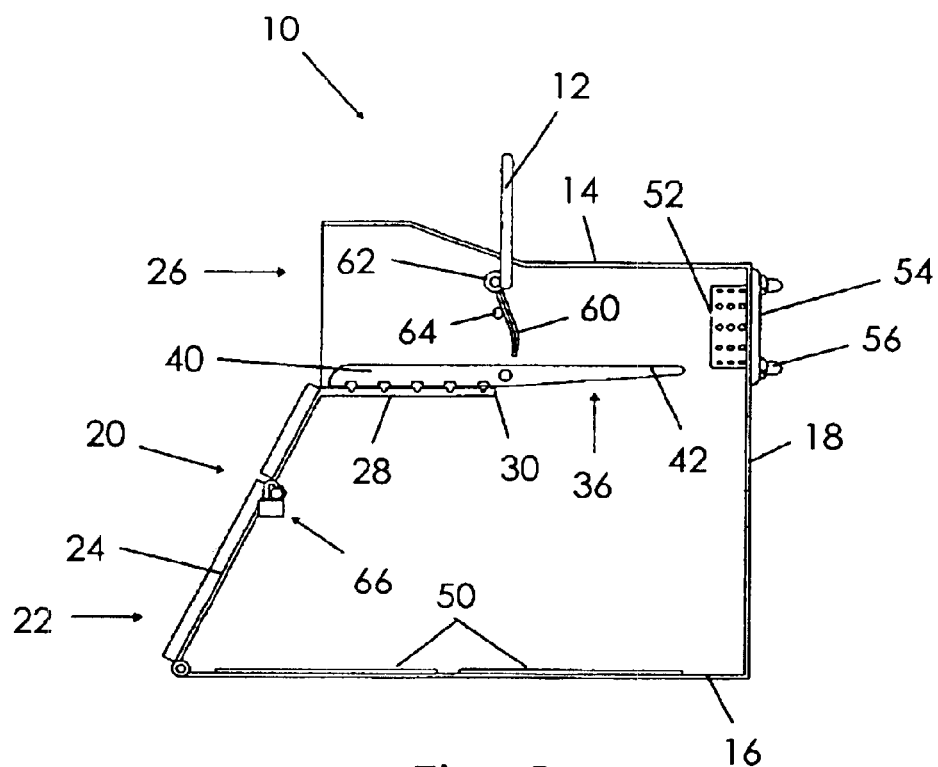
FIG. 3a is a front view of the rodent trap as in FIG. 2 with a trip board in a set configuration and utilizing glue strip containment means.
Figure 3B:
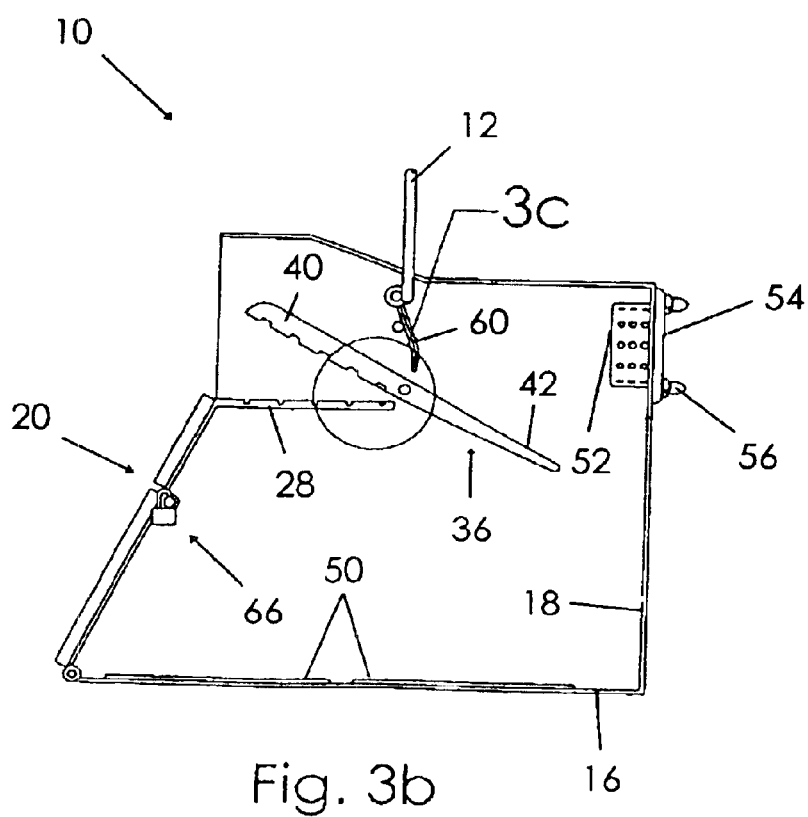
FIG. 3b is a front view of the rodent trap as in FIG. 3a with the trip board in a tripped configuration.

A trip board 36 is pivotally mounted within the interior space of the housing with a pivot pin 38 or similar fastener (FIG. 2). The trip board 36 is rotatable about the pivot pin 38 between a set configuration (FIG. 3a) and a tripped configuration (FIG. 3b). The trip board 36 is positioned slightly above the platform 28 but is substantially longer than the platform 28. The trip board 36 includes a first portion 40 that rests upon the platform 28 at the set configuration and includes a second portion 42 that extends inwardly into the interior space beyond a distal end 30 of the platform 28. The pivot pin 38 is positioned adjacent the distal end 30 of the platform 28 such that the second portion 42 of the trip board 36 is rotated downwardly when the trip board is pivoted to the tripped configuration (FIG. 3b).

Figure 3C:
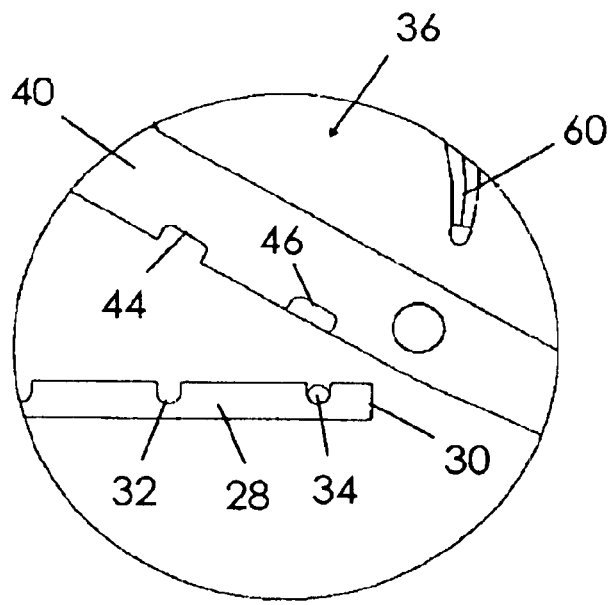
FIG. 3c is an isolated view on an enlarged scale of a portion of the trip board and platform shown in FIG. 3b.

An upper surface of the platform defines a plurality of platform grooves 32, each platform groove 32 extending substantially between front 17 and back 19 walls of the housing. The plurality of platform grooves 32 are spaced apart along the longitudinal extent of the platform 28. A metallic element 34 having a configuration complementary to a configuration of a platform groove 32, such as a nail or the like, may be removably nested in a selected platform groove 32 (FIG. 3c). The metallic element 34 may be selectively positioned in a desired platform groove 32 (FIG. 3d) as will be further described later. Of course, it would also be suitable for the metallic element 34 to have a singular position upon the platform 28.

Figure 3D:
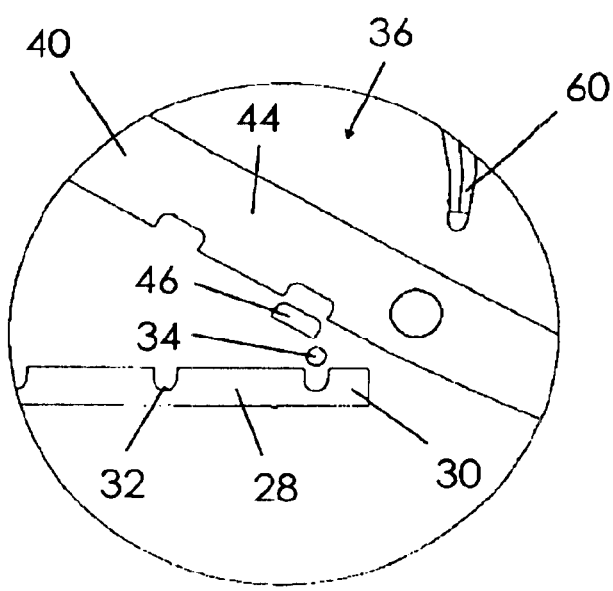
FIG. 3d is an exploded view of the illustration shown in FIG. 3c showing the magnet and magnetic element removed from their nested positions.

A lower surface of the first portion 40 of the trip board 36 defines a plurality of trip board grooves 44 positioned to correspond to the placement of the platform grooves 32 (FIG. 3c). A magnet 46 having a configuration complementary to a configuration of the trip board grooves 44 may be nested in a selected trip board groove 44 (FIGS. 3c and 3d). Accordingly, the magnet 46 and metallic element 34 are magnetically attracted to one another at the set configuration so as to bias the trip board to the set configuration even when weight is applied to the second portion 42 of the trip board 36, i.e. the weight of a rodent. In addition, the center of gravity of the trip board 36 is positioned such that the trip board 36 returns to the set configuration after the weight of a rodent is removed from the second portion 42.

The conditions causing a release of the trip board 36 may be adjusted by changing the placement of the magnet 46 and metallic element 34. More particularly, the particular grooves into which the metallic element 34 and magnet 46 are placed will change the amount of weight that can be placed upon the second portion 42 of the trip board 36 before breaking the attraction between the metallic element 34 and magnet 46. Specifically, the further the magnet 46 and metallic element 34 are displaced from the pivot point, i.e. closer to the entry opening 26, the more weight can be supported upon the second portion 42 of the trip board before it is rotated to the tripped configuration. Another means of adjusting the release of the trip board is to utilize a stronger magnet or even multiple magnets. Still another way to increase the hold between the platform 28 and trip board 36 is to utilize magnets on both locations rather than just magnet and metallic element. Preferably, a magnetic strip is used as the magnet although other magnets, multiple magnets, or self-adhesive magnets would also work. It is understood that the front wall 17 may be completely removed by a user for access to the trip board 36, platform 28, and release components.

As will be described more fully below, a rodent will be deposited into a containment area when the trip board 36 is caused to move to the tripped configuration by the rodent's weight. Preferably, the containment area is a container 48 that is positioned within the interior space of the housing and rests upon the bottom wall 16 (FIG. 2). The container 48 is preferably of a size extending substantially between the ramp 20 and second side wall 18 so as to have a capacity to hold multiple rodents. As shown particularly in FIG. 4b, glue pads 50 may used as an alternative to a container 48 as a means for containing deposited rodents. Multiple options exist for disposing of trapped rodents. Deposited rodents could be set free at a desired location, the entire trap could be submerged in water, or the container 48 itself may be filled with water or antifreeze so as to drown the rodents as they are caught.

Access is provided to the interior space of the rodent trap 10 so that trapped rodents may be periodically removed from the containment area. More particularly, a portion 22 of the ramp 20 is pivotally coupled to the bottom wall 16 with a hinge, pivot pin, or the like and is movable between open and closed configurations (FIGS. 5a and 5b). However, it is important to regulate access to the interior of the rodent trap 10, particularly if the container 48 is filled with antifreeze or similar liquid. In this regard, the movable ramp portion 22 is secured to the housing front wall 17 with a pin and padlock assembly 66. Specifically, a pin may be extended through the front 17 and back 19 walls and a pair of flanges on the ramp portion 22 and selectively secured with a lock (FIG. 5a).

A bait container 52 is attached to the inner surface of a removable panel 54 of the housing second side wall 18 (FIG. 2). The removable panel 54 is removably coupled to the housing second side wall 18 with thumb screws 56 or the like for quick and easy access to the bait container 52 (FIG. 1). The bait container 52 may contain a plurality of holes for allowing the scent of the bait to permeate the container. In addition, the top wall 14, second side wall 18, and other walls may also include holes 58 for allowing the scent to escape and lure rodents to the trap.

Another aspect of this invention is a plurality of probes 60 that are pivotally mounted within the interior space of the housing above the trip board 36 (FIG. 2). Each of the probes includes a generally arcuate configuration with a relatively sharp tip. The plurality of probes 60 is rotatably movable as a singular unit between a generally downwardly directed configuration and a rotated configuration in which the tips are directed away from the entry opening. The probes 60 are mounted with a spring hinge 62 so as to be biased toward the downward configuration although an unbiased configuration would also work. In the downward configuration (FIG. 2), the tips are slightly displaced from the trip board 36 so as to encourage a rodent to attempt to squeeze under them while pursuing the bait. As the rodent moves forward along the second portion 42 of the trip board 36, the probes 60 are rotated away from the entry opening 26. However, the tips of the biased probes will dig in to the rodent if the rodent attempts to reverse course and escape, thus forcing the rodent to continue along the second portion 42. Eventually, of course, the trip board 36 will release and deposit the rodent into the containment area. The probes 60 are mounted adjacent the pivot point of the trip board 36 so as to engage a rodent as it travels onto the second portion 42 of the trip board 36. A probe limit pin 64 extends between the front 17 and back 19 walls of the housing adjacent the plurality of probes 60. The limit pin 64 acts as a stop member and is situated to prevent the plurality of probes from being rotated toward the entry opening 26 beyond the downward configuration.

In use, a rodent such as a mouse is lured to the rodent trap 10 by the scent of bait in the bait container 52. The rodent is able to ascend the carpet-covered ramp 20 and enter the housing through the entry opening 26. Upon entering, the rodent is positioned upon the first portion 40 of the trip board 36 which rests upon the platform 28 in a set configuration. Further lured by the scent, the rodent may proceed along the second portion 42 of the trip board 36. In an embodiment utilizing the plurality of probes 60, the probes are pivoted as the rodent attempts to squeeze thereunder to obtain the bait. The probes 60 are configured to prod the rodent in a forward direction should the rodent attempt to reverse course. When the rodent proceeds a sufficient distance along the second portion 42, the weight thereof overcomes the attraction between the magnet 46 and metallic element 34 such that the trip board 36 is released and the rodent is deposited into the containment area. Periodically, rodents trapped in this manner may be removed through the movable ramp portion 22.

Accordingly, it can be seen that the rodent trap described herein is able to trap multiple rodents in that the rodents are unable to learn to avoid the trap and are not deterred from being trapped by previously caught rodents. In addition, the present invention is adjustable for the efficient capture of rodents of different sizes and weights.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A weight adjustable rodent trap, comprising:
   a housing having a bottom wall and a top wall and defining an interior space;
   a ramp extending substantially between said bottom and top walls at an oblique angle, said ramp situated to define an entry opening adjacent said top wall so as to enable a rodent to enter into said interior space through said entry opening after ascending said ramp;
   a platform fixedly mounted to said ramp adjacent said entry opening and extending into said interior space in a horizontal configuration, said platform having at least one metallic element situated thereon;
   a trip board pivotally mounted in said interior space and movable between a set configuration atop said platform and a tripped configuration rotated relative to said platform, said trip board having a magnet positioned thereon that is magnetically attracted to said at least one metallic element for biasing said trip board toward said set configuration until a weight of said rodent is placed upon a portion of said trip board to cause said trip board to move to said tripped configuration;
   means in said interior space beneath said trip board for containing said rodent, said rodent being deposited into said containing means when said trip board is moved to said tripped configuration by said rodents weight thereon;
   wherein said platform defines a plurality of platform grooves spaced apart along, said platform, each platform groove having a configuration for removably receiving said at least one metallic element;
   said trip board defines a plurality of trip board grooves spaced apart along, another portion of said trip board, each of said trip board grooves corresponding to a respective platform groove and having a configuration for removably receiving said magnet;
   wherein said containing means includes a container positioned in said interior space atop said bottom wall, said rodent being deposited into said container when said weight thereof is placed on said one portion of said trip board causing said trip board to move from said set configuration to said tripped configuration;
   wherein said ramp is pivotally coupled to said bottom wall and movable between a closed configuration enabling said rodent to ascend said ramp and an open configuration for enabling user access to said container, said container being removable from said interior space when said ramp is at said open configuration; and
   means for locking said ramp in said closing configuration.

2. The rodent trap as in claim 1 wherein said containing means includes a container positioned in said interior space atop said bottom wall, said rodent being deposited into said container when said weight thereof is placed on said one portion of said trip board causing said trip board to move from said set configuration to said tripped configuration.

3. The rodent trap as in claim 1 wherein said containing means is a glue strip positioned in said interior space atop said bottom wall, said rodent being deposited one said glue strip when said weight thereof is placed on said one portion of said trip board and said trip board is moved from said set configuration to said tripped configuration.

4. The rodent trap as in claim 1 further comprising:
   a plurality of probes each having a generally arcuate configuration pivotally mounted in said interior space above said trip board said plurality of probes being movable between a first configuration extending substantially between said top wall and said trip board and a second configuration rotatably displaced from said first configuration such that said rodent is enticed to urge said plurality of probes toward said second configuration, said plurality of probes having sharp tips, respectively, that are slightly displaced from said trip board at said first configuration;
   whereby said plurality of probes are rotated from said first configuration to said second configuration by forward movement of said rodent and said rodent is discouraged from reversing course by said sharp tips.

5. The rodent trap as in claim 4 further comprising a stop member mounted in said interior space adjacent said plurality of probes for preventing said plurality of probes from rotating toward said entry opening, whereby to prevent said rodent from reversing course and escaping after first engaging said plurality of probes.

6. The rodent trap as in claim 1 further comprising:
a side wall oppositely disposed from said ramp, said side wall having a panel that is removable from said side wall so as to provide selective access to said interior space;
a bait container removably mounted to an interior surface of said panel; and
wherein said top wall and said side wall define a plurality of apertures for enabling a scent from said bait container to escape from said housing.

7. The rodent trap as in claim 4 further comprising a handle coupled to said top wall of said housing for carrying said housing.

8. The rodent trap as in claim 4 further comprising:
a side wall oppositely disposed from said ramp, said side wall having a panel that is removable from said side wall so as to provide selective access to said interior space;
a bait container removably mounted to an interior surface of said panel; and
wherein said top wall and said side wall define a plurality of apertures for enabling a scent from said bait container to escape from said housing.

9. The rodent trap as in claim 8 wherein an outer surface of said ramp includes a carpet layer;
said rodent trap further comprising a front wall extending between said bottom wall and said top wall, said front wall being constructed of a transparent material.

10. A weight adjustable rodent trap, comprising:
a housing having a bottom wall and a top wall and defining an interior space;
a ramp extending substantially between said bottom and top walls at an oblique angle, said ramp situated to define an entry opening adjacent said top wall so as to enable a rodent to enter into said interior space through said entry opening after ascending said ramp;
a platform fixedly mounted to said ramp adjacent said entry opening and extending into said interior space in a horizontal configuration, said platform having a metallic element situated thereon;
means for selectively positioning said metallic element on said platform;
a trip board pivotally mounted in said interior space and movable between a set configuration atop said platform and a tripped configuration rotated relative to said platform, said trip board having a magnet positioned thereon;
means for selectively positioning said magnet on said trip board, whereby said magnet is magnetically attracted to said metallic element for biasing said trip board toward said set configuration until a weight of said rodent is placed upon a portion of said trip board causing said trip board to move to said tripped configuration;
means in said interior space beneath said trip board for containing said rodent, said rodent being deposited into said containing means when said trip board is moved to said tripped configuration by said rodent's weight thereon;
a plurality of probes pivotally mounted in said interior space above said trip board, said plurality of probes being movable between a first configuration extending substantially between said top wall and said trip board and a second configuration rotatably displaced from said first configuration;
means for biasing said plurality of probes toward said first configuration, whereby said plurality of probes are rotated from said first configuration to said second configuration by said rodent and said rodent is discouraged from reversing course as said plurality of probes are biased to return to said first configuration
wherein said plurality of probes each include a generally arcuate tip that is slightly displaced from said trip board when said plurality of probes are at said first configuration such that said rodent is enticed to urge said plurality of probes toward said second configuration, said each arcuate tip prodding said rodent in a forward direction along said trip board if said rodent attempts to reverse course and
a stop member mounted in said interior space adjacent said plurality of probes for preventing said plurality of probes from rotating toward said entry opening, whereby to prevent said rodent from reversing course and escaping after first engaging said plurality of probes.

11. The rodent trap as in claim 10 wherein:
said means for positioning said metallic element includes a plurality of platform grooves spaced apart along said platform, each platform groove having a configuration for removably receiving said metallic element; and
said means for positioning said magnet includes a plurality of trip board grooves spaced apart along another portion of said trip board, each of said trip board grooves corresponding to a respective platform groove and having a configuration for removably receiving said magnet.

12. The rodent trap as in claim 10 wherein said containing means includes a container positioned in said interior space atop said bottom wall, said container adapted to receive said rodent when said weight thereof is placed on said one portion of said trip board causing said trip board to move from said set configuration to said tripped configuration.

13. The rodent trap as in claim 12 wherein said ramp is pivotally coupled to said bottom wall and movable between a closed configuration enabling said rodent to ascend said ramp and an open configuration for enabling user access to said container, said container being removable from said interior space when said ramp is at said open configuration.

14. The rodent trap as in claim 10 wherein said containing means is a glue strip positioned in said interior space atop said bottom wall, said rodent being deposited onto said glue strip when said weight thereof is placed on said one portion of said trip board causing said trip board to move from said set configuration to said tripped configuration.

15. The rodent trap as in claim 10 further comprising:
a side wall oppositely disposed from said ramp, said side wall having a panel that is removable from said side wall so as to provide selective access to said interior space;
a bait container removably mounted to an interior surface of said panel;
a front wall extending between said bottom wall and said top wall, said front wall being constructed of a transparent material; and
wherein said top wall and said side wall define a plurality of apertures for enabling a scent from said bait container to escape from said housing.

16. A weight adjustable rodent trap, comprising:
a housing having a bottom wall and a top wall and defining an interior space;
a ramp extending substantially between said bottom and top walls at an oblique angle, said ramp situated to define an entry opening adjacent said top wall so as to enable a rodent to enter into said interior space through said entry opening after ascending said ramp;

a platform fixedly mounted to said ramp adjacent said entry opening and extending into said interior space in a horizontal configuration, said platform having at least one metallic element situated thereon;

a trip board pivotally mounted in said interior space and movable between a sat configuration atop said platform and a tripped configuration rotated relative to said platform, said trip board having a magnet positioned thereon that is magnetically attracted to said at least one metallic element for biasing said trip board toward said set configuration until a weight of said rodent is placed upon a portion of said trip board to cause said trip board to move to said tripped configuration;

means in said interior space beneath said trip board for containing said rodent, said rodent being deposited into said containing means when said trip board is moved to said tripped configuration by said rodent's weight thereon;

wherein said platform defines a plurality of platform grooves spaced apart along said platform, each platform groove having a configuration for removably receiving said at least one metallic element;

said trip board defines a plurality of trip board grooves spaced apart along another portion of said trip board, each of said trip board grooves corresponding to a respective platform groove and having a configuration for removably receiving said magnet;

wherein said containing means includes a container positioned in said interior space atop said bottom wall, said rodent being deposited into said container when said weight thereof is placed on said one portion of said trip board causing said trip board to move from said set configuration to said tripped configuration;

wherein said ramp is pivotally coupled to said bottom wall and movable between a closed configuration enabling said rodent to ascend said ramp and an open configuration for enabling user access to said container, said container being removable from said interior space when said ramp is at said open configuration;

a side wall oppositely disposed from said ramp, said side wall having a panel that is removable from said side wall so as to provide selective access to said interior space;

a bait container removably mounted to an interior surface of said panel;

a front wall extending between said bottom wall and said top wall, said front wall being constructed of a transparent material;

wherein said top wall and said side wall define a plurality of apertures for enabling a scent from said bait container to escape from said housing; and wherein an outer surface of said ramp includes a carpet layer.

* * * * *